(12) United States Patent
Osawa (10) Patent No.: US 7,006,328 B2
(45) Date of Patent: Feb. 28, 2006

(54) MAGNETIC RECORDING MEDIUM, PRODUCTION PROCESS THEREOF, AND MAGNETIC RECORDING AND REPRODUCING APPARATUS

(75) Inventor: Hiroshi Osawa, Chiba (JP)

(73) Assignee: Showa Denko Kabushiki Kaisha, Tokyo (JP)

(*) Notice: Subject to any disclaimer, the term of this patent is extended or adjusted under 35 U.S.C. 154(b) by 124 days.

(21) Appl. No.: 10/645,625

(22) Filed: Aug. 22, 2003

(65) Prior Publication Data
US 2004/0037005 A1    Feb. 26, 2004

Related U.S. Application Data

(60) Provisional application No. 60/406,034, filed on Aug. 27, 2002.

(30) Foreign Application Priority Data
Aug. 22, 2002  (JP)  ............. P2002-242518

(51) Int. Cl.
*G11B 5/012*    (2006.01)
*G11B 5/82*     (2006.01)
(52) U.S. Cl. ..................................... 360/135
(58) Field of Classification Search ............... 360/135; 428/694 TS, 694 SG
See application file for complete search history.

(56) References Cited

U.S. PATENT DOCUMENTS

| | | | | |
|---|---|---|---|---|
| 5,800,931 A | * | 9/1998 | Lee et al. ................... | 428/611 |
| 5,815,343 A | * | 9/1998 | Ishikawa et al. .......... | 360/97.01 |
| 6,057,021 A | * | 5/2000 | Ishikawa et al. ........... | 428/65.3 |
| 6,509,108 B1 | * | 1/2003 | Okuyama et al. ........... | 428/661 |
| 6,511,761 B1 | * | 1/2003 | Tanahashi et al. ..... | 428/694 TS |
| 6,761,982 B1 | * | 7/2004 | Sakawaki et al. ...... | 428/694 TS |
| 6,808,830 B1 | * | 10/2004 | Sakawaki et al. ...... | 428/694 TS |
| 6,821,653 B1 | * | 11/2004 | Fukushima et al. .... | 428/694 SG |
| 2001/0024743 A1 | * | 9/2001 | Kanbe et al. .......... | 428/694 TS |
| 2001/0031383 A1 | | 10/2001 | Sakawaki et al. ......... | 428/848.2 |
| 2001/0033457 A1 | * | 10/2001 | Furukawa et al. .......... | 360/135 |
| 2004/0258925 A1 | * | 12/2004 | Lee et al. ................... | 428/426 |

* cited by examiner

*Primary Examiner*—Jefferson Evans
(74) *Attorney, Agent, or Firm*—Sughrue Mion, PLLC (57) ABSTRACT

A magnetic recording medium comprising a glass substrate having grooves on the surface thereof, an orientation-determining layer, a non-magnetic undercoat layer, a magnetic layer, and a protective film, the layers and film being successively formed on the substrate. The orientation-determining layer contains at least one element selected from the group consisting of Co, Ni, and Fe and at least one element selected from the group consisting of W, Mo, Ta, and Nb.

9 Claims, 1 Drawing Sheet

MAGNETIC RECORDING MEDIUM, PRODUCTION PROCESS THEREOF, AND MAGNETIC RECORDING AND REPRODUCING APPARATUS

CROSS-REFERENCE TO RELATED APPLICATIONS

This application claims benefit of Provisional Application No. 60/406,034 filed Aug. 27, 2002, incorporated herein by reference, under 35 U.S.C. § 111(b) pursuant to 35 U.S.C. § 119(e) (1).

BACKGROUND OF THE INVENTION

1. Field of the Invention

The present invention relates to a magnetic recording medium which is employed in, for example, hard disk devices, to a process for producing the magnetic recording medium, and to a magnetic recording and reproducing apparatus.

2. Background Art

The recording density of a hard disk device (HDD), which is a magnetic recording and reproducing apparatus, has increased at a rate of 60% per year, and this tendency is expected to continue. Therefore, magnetic recording heads and magnetic recording media which are suitable for attaining high recording density are now under development.

Magnetic recording media employed in hard disk devices are required to have high recording density, and therefore demand has arisen for improvement of coercive force and reduction of medium noise.

Most magnetic recording media employed in hard disk devices have a structure including a magnetic recording medium substrate on which a metallic film is laminated through sputtering. Aluminum substrates and glass substrates are widely employed for producing magnetic recording media. An aluminum substrate is produced through the following process: an Ni—P-based alloy film (thickness: about 10 $\mu$m) is formed through electroless plating on an Al—Mg alloy substrate which has undergone mirror polishing, and the surface of the Ni—P-based alloy film is subjected to mirror polishing. Glass substrates are classified into two types; i.e., amorphous glass substrates and glass ceramic substrates. When either of these two types of glass substrate is employed to produce a magnetic recording medium, the substrate is subjected to mirror polishing.

In general, a magnetic recording medium employed to produce a hard disk device includes a non-magnetic substrate; a non-magnetic undercoat layer (formed of, for example, an Ni—Al-based alloy, Cr, or a Cr-based alloy); a non-magnetic intermediate layer (formed of, for example, a Co—Cr-based alloy or a Co—Cr—Ta-based alloy); a magnetic layer (formed of, for example, a Co—Cr—Pt—Ta-based alloy or a Co—Cr—Pt—B-based alloy); a protective film (formed of, for example, carbon), the layers and film being successively formed on the substrate; and a lubrication film containing a liquid lubricant and formed on the protective film.

In accordance with an increase in recording density of, for example, a magnetic disk device, demand has arisen for a magnetic recording medium exhibiting magnetic anisotropy in a circumferential direction (hereinafter may be referred to simply as "circumferential magnetic anisotropy"), and thus exhibiting excellent read-write conversion characteristics. Therefore, circumferential magnetic anisotropy is imparted to a magnetic recording medium including an aluminum alloy substrate coated with an NiP film through plating (hereinafter the substrate may be referred to as an "aluminum substrate"), by means of mechanically forming grooves on the surface of the NiP film in a circumferential direction (hereinafter the procedure will be referred to as "mechanical texturing").

Non-magnetic substrates; for example, glass substrates, are suitable for attaining high recording density, since they exhibit excellent impact resistance, rigidity, and evenness. Therefore, when a magnetic recording medium including a non-magnetic substrate formed of glass can be provided with circumferential magnetic anisotropy, the resultant recording medium is envisaged to exhibit excellent read-write conversion characteristics.

Several methods have been proposed for subjecting a glass substrate to mechanical texturing, to thereby form texture grooves thereon. For example, there has been proposed a method for forming minute, uniform texture grooves, which employs a suspension containing abrasive grains and a solution of a hydroxyl-group-containing compound, and a woven tape formed of plastic fiber. See Japanese Patent No. 3117438.

There has also been proposed a method for forming minute, uniform texture grooves, which employs diamond abrasive grains together with $CeO_2$ abrasive grains. See U.S. Pat. No. 6,248,395.

However, difficulty is encountered in imparting sufficient circumferential magnetic anisotropy to a magnetic recording medium including a glass substrate by merely forming texture grooves on the substrate. In view of the foregoing, there has been proposed a method in which an amorphous layer containing at least Ni and P is formed through sputtering on a glass substrate having linear texture grooves on the surface thereof, to thereby impart circumferential magnetic anisotropy to the resultant magnetic recording medium. See Japanese Patent Application Laid-Open (kokai) No. 2001-209927.

The above-proposed method for forming an amorphous layer containing at least Ni and P on a glass substrate having texture grooves constitutes an attempt to obtain an effect similar to that obtained by the aforementioned NiP-plated aluminum substrate having texture grooves. In reality, when a Cr-based undercoat film, a Co-based magnetic layer, and a protective film are successively formed on the amorphous layer formed through the above method, the resultant magnetic recording medium exhibits magnetic anisotropy. However, when the amorphous layer containing at least Ni and P is employed, difficulty is encountered in attaining high coercive force and high squareness ratio, and satisfactory read-write conversion characteristics fail to be obtained.

SUMMARY OF THE INVENTION

In view of the foregoing, an object of the present invention is to provide a magnetic recording medium including a glass substrate having grooves on the surface thereof, which medium exhibits circumferential magnetic anisotropy, high coercive force, high squareness ratio, and excellent read-write conversion characteristics.

Another object of the present invention is to provide a process for producing the medium.

Still another object of the present invention is to provide a magnetic recording and reproducing apparatus containing the medium.

In order to solve the aforementioned problems, the present inventors have performed extensive studies, and have found that, when an orientation-determining layer of a magnetic recording medium is formed of an alloy layer containing at least one element selected from among Co, Ni, and Fe and at least one element selected from among W, Mo, Ta, and Nb, characteristics of a magnetic recording and reproducing apparatus incorporating the magnetic recording medium can be improved. The present invention has been accomplished on the basis of this finding. Accordingly, the present invention provides the following.

(1) A magnetic recording medium comprising a glass substrate having grooves on the surface thereof, an orientation-determining layer, a non-magnetic undercoat layer, a magnetic layer, and a protective film, the layers and film being successively formed on the substrate, wherein the orientation-determining layer contains at least one element selected from the group consisting of Co, Ni, and Fe and at least one element selected from the group consisting of W, Mo, Ta, and Nb.

(2) A magnetic recording medium according to (1), wherein the orientation-determining layer contains at least one alloy selected from among a Co—W-based alloy, a Co—Mo-based alloy, a Co—Ta-based alloy, a Co—Nb-based alloy, an Ni—Ta-based alloy, an Ni—Nb-based alloy, an Fe—W-based alloy, an Fe—Mo-based alloy, and an Fe—Nb-based alloy.

(3) A magnetic recording medium according to (1) or (2), wherein the orientation-determining layer has a thickness falling within a range of 10 Å to 300 Å.

(4) A magnetic recording medium according to any one of (1) through (3), wherein the glass substrate is formed of amorphous glass.

(5) A magnetic recording medium according to any one of (1) through (4), wherein the grooves have a line density of at least 7,500 (lines/mm).

(6) A magnetic recording medium according to any one of (1) through (5), wherein the magnetic anisotropy index of the magnetic layer (coercive force in a circumferential direction/coercive force in a radial direction) is at least 1.05.

(7) A magnetic recording medium according to any one of (1) through (6), wherein the magnetic anisotropy index of residual magnetization (residual magnetization in a circumferential direction/residual magnetization in a radial direction) is at least 1.05.

(8) A magnetic recording medium according to any one of (1) through (7), wherein the non-magnetic undercoat layer contains a Cr layer, or a Cr alloy layer containing at least one element selected from the group consisting of Ti, Mo, Al, Ta, W, Ni, B, Si, and V.

(9) A magnetic recording medium according to any one of (1) through (8), wherein the magnetic layer contains at least one alloy selected from the group consisting of a Co—Cr—Pt-based alloy, a Co—Cr—Ta alloy, a Co—Cr—Pt—Ta-based alloy, a Co—Cr—Pt—B-based alloy, and a Co—Cr—Pt—B—Y-based alloy, wherein Y represents Ta or Cu.

(10) A magnetic recording and reproducing apparatus comprising a magnetic recording medium as recited in any one of (1) through (9), and a magnetic head for recording of data onto the medium and for reproduction of the data therefrom.

DETAILED DESCRIPTION OF THE INVENTION

The magnetic recording medium of the present invention includes a glass substrate having grooves on its surface, an orientation-determining layer, a non-magnetic undercoat layer, a magnetic layer, and a protective film, the layers and film being successively formed on the substrate. A characteristic feature of the magnetic recording medium resides in that the orientation-determining layer contains at least one element selected from the group consisting of Co, Ni, and Fe and at least one element selected from the group consisting of W, Mo, Ta, and Nb.

Figure 1:
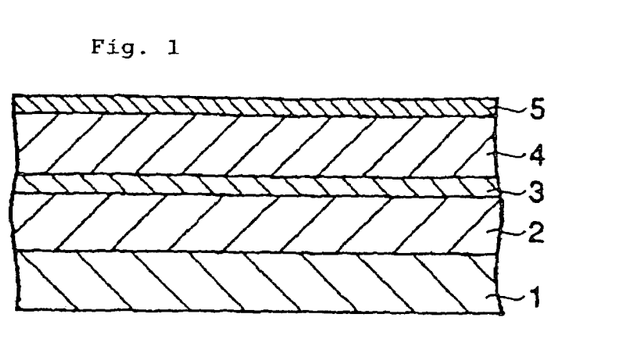
FIG. 1 is a schematic cross-sectional view of the magnetic recording medium of the present invention.

FIG. 1 schematically shows an embodiment of the magnetic recording medium of the present invention. Reference numeral 1 denotes a glass substrate, 2 an orientation-determining film, 3 a non-magnetic undercoat layer, 4 a magnetic layer, and 5 a protective film.

The glass substrate 1 may be formed of amorphous glass or glass ceramic. Amorphous glass may be general-purpose glass such as soda-lime glass, aluminoborosilicate glass, or aluminosilicate glass. Glass ceramic may be lithium-based glass ceramic. Particularly, the glass substrate is preferably formed of amorphous glass exhibiting uniform physical properties (e.g., hardness), since texturing can be performed uniformly on the surface of the substrate.

The glass substrate 1 is subjected to, for example, mechanical texturing by use of a lapping tape containing fixed abrasive grains or by use of free abrasive grains, to thereby form grooves on the surface of the substrate. The grooves formed on the surface of the glass substrate 1 preferably run along a circumferential direction of the substrate. The average surface roughness (Ra) of the glass substrate 1 having the grooves on its surface preferably falls within a range of 0.1 nm to 1 nm (1 Å to 10 Å), more preferably 0.2 nm to 0.8 nm (2 Å to 8 Å).

When the average surface roughness (Ra) is less than 0.1 nm, the glass substrate 1 becomes excessively smooth, and thus the effect of enhancing the magnetic anisotropy of the magnetic layer 4 is lowered. In contrast, when the average surface roughness (Ra) exceeds 1 nm, the evenness of the surface of the medium is lowered, leading to poor glide height characteristics. As a result, difficulty is encountered in reducing the flying height of a magnetic head during the course of recording and reproduction of data.

The surface of the glass substrate 1 preferably has grooves having a line density of 7,500 (lines/mm) or more. The line density is measured along a radial direction of the glass substrate. The reason why the line density is set to 7,500 (lines/mm) or more is that the effects of the grooves are reflected in improvement of magnetic characteristics (e.g., enhancement of coercive force) and improvement of read-write conversion characteristics (e.g., enhancement of SNR (signal to noise ratio) or PW50 (half power width of isolated read pulse)). The line density is more preferably 20,000 (lines/mm) or more. When the grooves have a line density of 20,000 (lines/mm) or more, the aforementioned effects of the grooves become more remarkable.

The upper limit of the line density is 200,000 (lines/mm). When the line density exceeds 200,000 (lines/mm), the distance between adjacent grooves becomes less than 50 Å, which is smaller than the size of individual grains in the non-magnetic undercoat layer, and thus the magnetic anisotropy of the magnetic recording medium is lowered.

Preferably, the grooves run generally along the circumferential direction of the substrate. As used herein, the term "grooves" refers to irregularities of the surface, in which the distance between the top and the bottom of each irregularity shown in a radial cross section of the substrate preferably falls within a range of 0.02 nm to 20 nm (more preferably a range of 0.05 nm to 10 nm). When the distance falls within the above range, magnetic anisotropy attributed to the surface irregularities effectively enhances read-write conversion characteristics. Grooves having the aforementioned distance in excess of 20 nm (i.e., excessively large irregularities) may adversely affect uniformity of neighboring grooves.

The grooves are preferably formed through, for example, mechanical texturing making use of a lapping tape containing fixed abrasive grains or making use of free abrasive grains.

The line density of the grooves can be measured by use of, for example, an AFM (atomic force microscope, product of Digital Instruments (US)).

The line density is measured under the following conditions: scan width: 1 μm, scan rate: 1 Hz, number of samples: 256, mode: tapping mode. A probe is radially moved for scanning the glass substrate serving as a sample, to thereby obtain a scan image of AFM. A flatten order is determined at 2, and plane-fit auto-processing, which is a type of flattening processing, is carried out with respect to the X-axis and Y-axis of the scan image, to thereby flatten the image. A box area of about 0.5 μm×about 0.5 μm is defined on the flattened image, and the line density within the box is calculated. The line density is obtained by converting the total number of crossings on the X-axis centerline of the groove top and the bottom and the Y-axis centerline of the distance between the groove top and the bottom to the corresponding number per mm. Specifically, the line density is the number of irregularities of the texture grooves per mm in a radial direction.

Line densities are measured at different points on the surface of the sample (i.e., the glass substrate), and the average value and standard deviation of the measured densities are obtained. The average value is regarded as the line density of the grooves of the glass substrate. The number of points at which the line density is measured is determined such that the average value and the standard deviation can be obtained. For example, the number of points at which the line density is measured can be determined to be 10. When the average and the standard deviation are obtained at 8 of the 10 points after excluding the point at which the line density is maximum and the point at which the line density is minimum, abnormal measurement data can be eliminated, and thus accuracy in measurement can be enhanced.

The orientation-determining film 2 is provided for determining the crystal orientation of the non-magnetic undercoat layer 3 formed directly on the film 2 and for determining the crystal orientation of the magnetic layer 4 formed on the layer 3, to thereby enhance the circumferential magnetic anisotropy of the magnetic layer 4. The orientation-determining film 2 serves not only as a film for determining the crystal orientation of the layers 3 and 4, but also as a film for micronizing crystal grains in the non-magnetic undercoat layer 3 and the magnetic layer 4.

The orientation-determining film 2 may be formed of an alloy layer containing at least one element selected from the group consisting of Co, Ni, and Fe and at least one element selected from the group consisting of W, Mo, Ta, and Nb.

No particular limitations are imposed on the composition of the alloy layer employed in the aforementioned orientation-determining film 2. However, preferably, the total amount of Co, Ni, and Fe falls within a range of 25 at % to 70 at %, and the total amount of W, Mo, Ta, and Nb falls within a range of 30 at % to 75 at %. When the total amount of Co, Ni, and Fe is less than 25 at %, the crystal orientation of the non-magnetic undercoat layer becomes insufficient, and thus coercive force is lowered, whereas when the total amount of Co, Ni, and Fe exceeds 70 at %, the orientation-determining film is magnetized, which is not preferable. Meanwhile, when the total amount of W, Mo, Ta, and Nb is less than 30 at %, the circumferential magnetic anisotropy of the magnetic layer is lowered, whereas when the total amount of Mo, Ta, and Nb exceeds 75 at %, the crystal orientation of the non-magnetic undercoat layer becomes insufficient, and thus coercive force is lowered.

The aforementioned orientation-determining film 2 is more preferably formed of a layer containing at least one alloy selected from the group consisting of a Co—W-based alloy, a Co—Mo-based alloy, a Co—Ta-based alloy, a Co—Nb-based alloy, an Ni—Ta-based alloy, an Ni—Nb-based alloy, an Fe—W-based alloy, an Fe—Mo-based alloy, and an Fe—Nb-based alloy. The present inventors have performed extensive studies, and have found that when an alloy having an Fe7W6 structure is employed in the orientation-determining film, the circumferential magnetic anisotropy of the magnetic layer is further enhanced. When the alloy layer constituting the orientation-determining film contains an Fe7W6 structure in an amount of 25% or more, the circumferential magnetic anisotropy of the magnetic layer is further enhanced. The W content of a CoW-based alloy preferably falls within a range of 30 at % to 85 at %. The Mo content of a CoMo-based alloy preferably falls within a range of 30 at % to 85 at %. The Ta content of a CoTa-based alloy preferably falls within a range of 38 at % to 65 at %. The Nb content of a CoNb-based alloy preferably falls within a range of 37 at % to 86 at %. The Ta content of an NiTa-based alloy preferably falls within a range of 38 at % to 63 at %. The Nb content of an NiNb-based alloy preferably falls within a range of 31 at % to 86 at %. The W content of an Fe—W-based alloy preferably falls within a range of 37 at % to 86 at %. The Mo content of an Fe—Mo-based alloy preferably falls within a range of 35 at % to 85 at %. The Nb content of an Fe—Nb-based alloy preferably falls within a range of 40 at % to 86 at %.

Each of these alloys (i.e., Co—W-based, Co—Mo-based, Co—Ta-based, Co—Nb-based, Ni—Ta-based, Ni—Nb-based, Fe—W-based, Fe—Mo-based, and Fe—Nb-based alloys) exhibits the aforementioned characteristics, and an alloy containing a combination of some of these alloys exhibits similar characteristics. For example, a Co—W—Mo-based alloy, a Co—Ni—Nb-based alloy, or a Co—W—Mo—Ta-based alloy exhibits similar characteristics.

In the present invention, the thickness of the orientation-determining film preferably falls within a range of 10 Å to 300 Å. When the thickness of the orientation-determining film is less than 10 Å, the crystal orientation of the non-magnetic undercoat layer becomes insufficient, and thus coercive force is lowered, whereas when the thickness of the orientation-determining film exceeds 300 Å, the circumferential magnetic anisotropy of the magnetic layer is lowered. In order to enhance the circumferential magnetic anisotropy of the magnetic layer, more preferably, the thickness of the orientation-determining film falls within a range of 20 Å to 100 Å.

In the present invention, the orientation-determining film may contain additive elements. Examples of the additive elements include Ti, V, Cr, Mn, Zr, Hf, Ru, B, Al, Si, and P. The total amount of the additive elements is preferably 20 at % or less. When the total amount exceeds 20 at %, the aforementioned effects of the orientation-determining film are lowered. The lower limit of the total amount of additive elements is 0.1 at %. When the total amount is less than 0.1 at %, the effect of the additive elements fails to be obtained.

The non-magnetic undercoat layer 3 is preferably formed of a Cr layer or a Cr alloy layer containing Cr and one or more elements selected from the group consisting of Ti, Mo, Al, Ta, W, Ni, B, Si, and V.

From the viewpoint of improvement of SNR characteristics of the magnetic recording medium, the non-magnetic undercoat layer is preferably formed of a layer of a Cr alloy containing Mo, W, V, or Ti (e.g., a Cr—Mo—, Cr—W—, Cr—V—, or Cr—Ti-based alloy) (such a Cr alloy has a lattice constant larger than that of Cr), so as to establish lattice matching between the Cr alloy and a Co alloy in the magnetic layer.

Addition of B to the aforementioned Cr layer or Cr alloy layer is preferred, since the effect of micronizing crystals is obtained, and SNR characteristics of the magnetic recording medium are enhanced.

Preferably, crystals of the Cr layer or Cr alloy layer constituting the non-magnetic undercoat layer 3 are predominantly oriented along a (100) plane. As a result, crystals of a Co alloy in the magnetic layer formed on the non-magnetic undercoat layer are strongly oriented along a (11•0) plane, leading to improvement of magnetic characteristics (e.g., coercive force (Hc)) and recording and reproduction characteristics (e.g., SNR).

As used herein, the symbol "•" of the crystal plane notation refers to the abbreviation of a Miller-Bravais index. In general, crystal planes of Co (hexagonal system) are represented by four indices (hkil). Of these indices, the index "i" is defined as follows: i=–(h+k). Therefore, the indices (hkil) can be abbreviated as (hk•l).

The magnetic layer 4 is preferably formed of a Co alloy which predominantly contains Co, which has an hcp structure, and which establishes excellent lattice matching with, for example, a (100) plane in the non-magnetic undercoat layer provided directly below the magnetic layer. "Predominantly Conations Co" means that Co is present in an amount of more than 50%. The magnetic layer preferably contains any one species selected from among, for example, a Co—Cr—Ta-based alloy, a Co—Cr—Pt-based alloy, a Co—Cr—Pt—Ta-based alloy, a Co—Cr—Pt—B based alloy, a Co—Cr—Pt—B—Ta-based alloy, and a Co—Cr—Pt—B—Cu-based alloy.

When a Co—Cr—Ta based alloy is employed, preferably, the Cr content falls within a range of 10 at % to 25 at %, and the Ta content falls within a range of 8 at % to 16 at %, from the viewpoint of improvement of SNR.

When a Co—Cr—Pt-based alloy is employed, preferably, the Cr content falls within a range of 10 at % to 25 at %, and the Pt content falls within a range of 8 at % to 16 at %, from the viewpoint of improvement of SNR.

When a Co—Cr—Pt—Ta based alloy is employed, preferably, the Cr content falls within a range of 10 at % to 25 at %, the Pt content falls within a range of 8 at % to 25%, the Pt content falls within a range of 8 at % to 16 at %, and the Ta content falls within a range of 1 at % to 4 at %, from the view point of improvement of SNR.

When a Co—Cr—Pt—B-based alloy is employed, preferably, the Cr content falls within a range of 10 at % to 25 at %, the Pt content falls within a range of 8 at % to 16 at %, and the B content falls within a range of 1 at % to 20 at %, from the viewpoint of improvement of SNR.

When a Co—Cr—Pt—B—Ta-based alloy is employed, preferably, the Cr content falls within a range of 10 at % to 25 at %, the Pt content falls within a range of 8 at % to 16 at %, the B content falls within a range of 1 at % to 20 at %, and the Ta content falls within a range of 1 at % to 4 at %, from the viewpoint of improvement of SNR.

When a Co—Cr—Pt—B—Cu-based alloy is employed, preferably, the Cr content falls within a range of 10 at % to 25 at %, the Pt content falls within a range of 8 at % to 16 at %, the B content falls within a range of 2 at % to 20 at %, and the Cu content falls within a range of 1 at % to 4 at %, from the viewpoint of improvement of SNR.

So long as the thickness of the magnetic layer 4 is 15 nm or more, no problem arises in terms of thermal stability. However, from the viewpoint of high recording density, the thickness of the magnetic layer is preferably 40 nm or less. This is because, when the thickness exceeds 40 nm, crystal grains in the magnetic layer become large in size, and preferred recording and reproduction characteristics fail to be obtained. The magnetic layer may have a multi-layer structure, and a plurality of layers constituting the magnetic layer may be formed of combinations of the aforementioned materials. When the magnetic layer has a multi-layer structure, a layer of the magnetic layer that is provided directly atop the non-magnetic undercoat layer is preferably formed of a Co—Cr—Pt—B—Ta-based alloy, a Co—Cr—Pt—B—Cu-based alloy, or a Co—Cr—Pt—B-based alloy, from the viewpoint of improvement of SNR characteristics among recording and reproduction characteristics. The uppermost layer of the magnetic layer is preferably formed of a Co—Cr—Pt—B—Cu-based alloy or a Co—Cr—Pt—B-based alloy, from the viewpoint of improvement of SNR characteristics among recording and reproduction characteristics. Preferably, a non-magnetic intermediate layer is provided between the non-magnetic undercoat layer 3 and the magnetic layer 4 for the purpose of promoting epitaxial growth of a Co alloy. Through provision of the intermediate layer, magnetic characteristics (e.g., coercive force) and recording and reproduction characteristics (e.g., SNR) are improved. The non-magnetic intermediate layer may contain Co and Cr. When the non-magnetic intermediate layer is formed of a Co—Cr-based alloy, the Cr content preferably falls within a range of 25 at % to 45 at %, from the viewpoint of improvement of SNR. When the non-magnetic intermediate layer is formed of a Co—Cr—Ru-based alloy, the total amount of the Cr and Ru preferably falls within a range of 25 at % to 45 at %, the Cr content preferably falls within a range of 5 at % to 30 at % and the Ru content preferably falls within a range of 5 at % to 30 at %, from the viewpoint of improvement of SNR. When the non-magnetic intermediate layer is formed of a Co—Cr—Ta-based alloy, the total amount of the Cr and Ta preferably falls within a range of 25 at % to 45 at %, the Cr content preferably falls within a range of 15 at % to 45 at % and the Ta content preferably falls within a range of 1 at % to 10 at %, from the viewpoint of improvement of SNR. The non-magnetic intermediate layer preferably has a thickness falling within a range of 0.5 nm to 3 nm, from the viewpoint of improvement of SNR.

In order to improve thermal decay of the magnetic recording medium, an antiferromagnetic coupling layer may be provided between the non-magnetic undercoat layer 3 and the magnetic layer 4. The antiferromagnetic coupling layer is formed of a stabilization layer and a non-magnetic coupling layer. The stabilization layer may be formed of, for example, a Co—Ru-based alloy, a Co—Cr-based alloy, a Co—Cr—Pt-based alloy, a Co—Cr—Pt—B-based alloy, or a Co—Cr—Ta-based alloy, which exhibits magnetic property. The non-magnetic coupling layer is preferably formed of Ru. The thickness of the Ru layer is preferably 0.8 nm or thereabout. This is because, when the Ru layer has such a thickness, the antiferromagnetic coupling intensity becomes a local maximum.

When the magnetic layer 4 contains B, preferably, the Cr content of a region in the vicinity of the boundary between the non-magnetic undercoat layer and the magnetic layer, in which the B content is at least 1 at %, is 40 at % or less. When the Cr content is 40 at % or less, coexistence of Cr and B of high concentration can be prevented, whereby the amount of a covalently bonded compound formed from Cr and B can be reduced to a possibly minimum level, thereby preventing deterioration of crystal orientation of the magnetic layer resulting from formation of such a compound.

The protective film 5 may be formed of a conventionally known material; for example, a single-component material such as carbon or SiC, or a material predominantly containing such a component. The thickness of the protective film preferably falls within a range of 1 nm to 10 nm, from the viewpoint of magnetic spacing loss or durability when employed at high recording density. The term "magnetic spacing" refers to the distance between a read/write element of a magnetic head and the magnetic layer. When the magnetic spacing is smaller, read-write conversion characteristics are more enhanced. The protective film, which is present between the read-write element of the head and the magnetic layer, plays a role for increasing the magnetic spacing.

If desired, a lubrication layer formed of a fluorine-based lubricant (e.g., perfluoropolyether) may be provided on the protective film 5.

The magnetic layer of the magnetic recording medium of the present invention preferably has a magnetic anisotropy index (OR) of 1.05 or more (more preferably 1.1 or more). The magnetic anisotropy index is represented by (coercive force in a circumferential direction/coercive force in a radial direction).

When the magnetic anisotropy index is 1.05 or more, magnetic characteristics (e.g., coercive force) and read-write conversion characteristics (e.g., SNR and PW50) are further enhanced. When the coercive force of the magnetic recording medium is increased to a high level, in some cases, the magnetic anisotropy index, which is defined by the ratio of coercive force (Hc) in a circumferential direction to Hc in a radial direction, is measured to be lower than the actual value.

In the present invention, in order to correct such an error, the magnetic anisotropy index of residual magnetization is employed in combination. The magnetic anisotropy index of residual magnetization (MrtOR) is defined by the ratio of residual magnetization (Mrt) in a circumferential direction to residual magnetization (Mrt) in a radial direction (i.e., MrtOR=Mrt in a circumferential direction/Mrt in a radial direction). When the magnetic anisotropy index of residual magnetization is 1.05 or more, preferably 1.1 or more, magnetic characteristics (e.g., coercive force) and read-write conversion characteristics (e.g., SNR and PW50) are further enhanced.

When all the magnetic domains in the magnetic layer are oriented in a circumferential direction (which is the ideal case), the denominator of the formula for calculating the magnetic anisotropy index becomes zero, and thus OR or MrtOR becomes infinity.

The magnetic anisotropy index (OR) or the magnetic anisotropy index of residual magnetization (MrtOR) is measured by use of a vibrating sample magnetometer (VSM).

Figure 2:
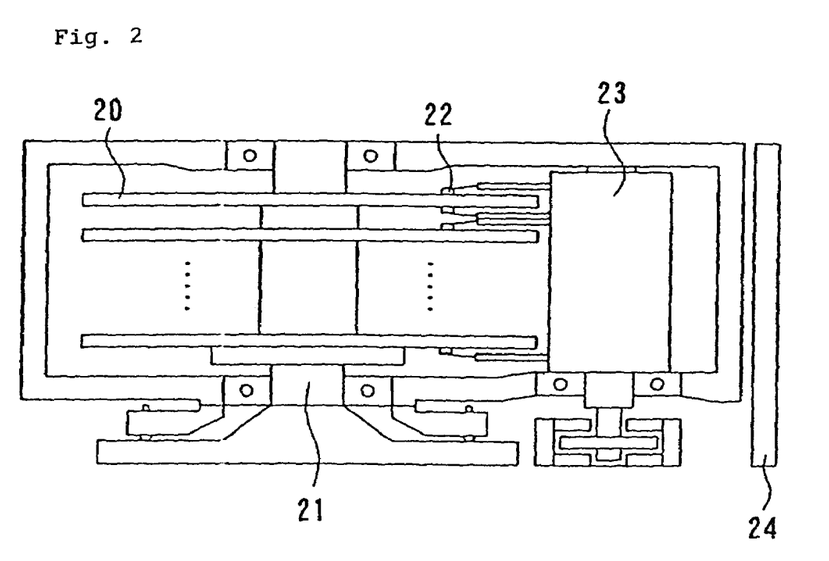
FIG. 2 shows a magnetic recording and reproducing apparatus incorporating the magnetic recording medium of the present invention.

FIG. 2 shows an embodiment of the magnetic recording and reproducing apparatus incorporating the aforementioned magnetic recording medium. The magnetic recording and reproducing apparatus shown in FIG. 2 includes a magnetic recording medium 20 having the structure shown in FIG. 1; a medium-driving section 21 which rotates the medium 20; a magnetic head 22 which is employed for recording of data onto the medium 20 and for reproduction of the data therefrom; a head-driving section 23 which drives the magnetic head 22 relative to the medium 20; and a recorded/reproduced-signal-processing system 24. In the recorded/reproduced-signal-processing system 24, input data are processed and recording signals are sent to the magnetic head 22, or reproduction signals from the head 22 are processed and the resultant data are output. The magnetic recording and reproducing apparatus of the present invention may employ, as the magnetic head 22, a head suitable for higher recording density containing a reproduction element such as an anisotropic magnetoresistance (AMR) element or a giant magnetoresistive (GMR) element.

The magnetic recording and reproducing apparatus of the present invention is inexpensive and suitable for realization of high recording density, since the apparatus employs the magnetic recording medium produced through a production process in which the glass substrate is directly subjected to texturing.

The magnetic recording and reproducing apparatus of the present invention employs the magnetic recording medium in which average roughness and micro-waviness are small, and thus read-write conversion characteristics are improved. In addition, even when the magnetic head is used at a low flying height in order to reduce spacing loss, the apparatus exhibits excellent error characteristics.

The aforementioned magnetic recording and reproducing apparatus is suitable for attaining high recording density.

An embodiment of the production process of the present invention will next be described.

The glass substrate may be formed of amorphous glass or glass ceramic. However, the glass substrate is preferably formed of amorphous glass, since, when the amorphous glass substrate is subjected to for example texturing, grooves are more uniformly formed on the substrate as compared with the case of the glass ceramic substrate.

The average surface roughness (Ra) of the glass substrate is preferably 2 nm (20 Å) or less, more preferably 1 nm or less.

The micro-waviness (Wa) of the surface of the glass substrate is preferably 0.3 nm or less, more preferably 0.25 nm or less. From the viewpoint of flying stability of a magnetic head, the average surface roughness (Ra) of at least one of an edge portion and a side portion of a chamfer section of the end surface of the substrate is preferably 10 nm or less, more preferably 9.5 nm or less. The chamfer section can have a width of 0.1 to 0.2 mm and an angle of 20 to 40 degrees. The micro-waviness (Wa) can be obtained as an average surface roughness as measured within a measurement range of 80 μm by use of, for example, a surface roughness measuring apparatus P-12 (product of KLM-Tencor, CA, USA).

Firstly, the surface of the glass substrate is subjected to texturing, so as to form, on the surface thereof, grooves having a line density of 7,500 (lines/mm) or more. For example, in order to form, on the surface of the glass substrate, texture grooves having a line density of 7,500 (lines/mm) or more, the surface is subjected to mechanical texturing in a circumferential direction of the substrate by use of fixed abrasive grains and/or free abrasive grains. For example, texturing is carried out through the following procedure: a polishing tape is pressed onto the surface of the substrate to thereby bring the tape into contact with the surface, a polishing slurry containing abrasive grains is supplied between the tape and the substrate, and the polishing tape is moved in a tape-winding direction while the substrate is rotated. The substrate may be rotated at 200 rpm to 1,000 rpm. The polishing slurry may be supplied at a rate of 10 ml/minute to 100 ml/minute. The polishing tape may be moved at a rate of 1.5 mm/minute to 150 mm/minute. The size of abrasive grains contained in the polishing slurry may be 0.05 µm to 0.3 µm at D90 (i.e., cumulative mass % is 90 mass %). The polishing tape may be pressed onto the substrate at a force of 1 kgf to 15 kgf (9.8 N to 147 N). These conditions are appropriately determined so as to form texture grooves having a line density of preferably 7,500 (lines/mm) or more, more preferably 20,000 (lines/mm) or more.

The average surface roughness (Ra) of the glass substrate 1 having texture grooves on its surface preferably falls within a range of 0.1 nm to 1 nm (1 Å to 10 Å), more preferably 0.2 nm to 0.8 nm (2 Å to 8 Å).

The glass substrate may be subjected to texturing including oscillation. The term "oscillation" refers to a process in which a tape is caused to travel in a circumferential direction of the substrate while the tape is reciprocated in a radial direction of the substrate. Preferably, oscillation is performed at a rate of 60 times/minute to 1,200 times/minute.

Texturing may be carried out by means of a method for forming texture grooves having a line density of 7,500 (lines/mm) or more. In addition to the aforementioned mechanical texturing method, a method in which fixed abrasive grains are used, a method in which fixed abrasive stones are used, or a method employing laser abrasion may be carried out.

Sputtering for forming the respective layers is carried out under, for example, the following conditions. The chamber employed for forming the layers is evacuated to $10^{-4}$ Pa to $10^{-7}$ Pa. The glass substrate having texture grooves on its surface is placed in the chamber, a sputtering gas (e.g., Ar gas) is brought into the chamber, and discharging is carried out, to thereby form the layers through sputtering. During the course of sputtering, power to be applied is regulated to 0.2 kW to 2.0 kW. When the discharging time and the power to be applied are regulated, the layers having desired thicknesses can be formed.

After formation of the orientation-determining film and before formation of the non-magnetic undercoat layer, preferably, a step of exposing the surface of the orientation-determining film to an oxygen atmosphere is carried out. The oxygen atmosphere to which the film is exposed preferably contains, for example, an oxygen gas of $5\times10^{-4}$ Pa or more. The exposure gas may be brought into contact with moisture. The exposure time is preferably 0.5 seconds to 15 seconds. In the exposure step, for example, the substrate on which the orientation-determining film has been formed may be removed from the chamber, followed by exposure of the film to air or an oxygen atmosphere. Alternatively, air or oxygen may be brought into the chamber to thereby expose the orientation-determining film thereto, without removal of the substrate from the chamber. The latter exposure process is preferred, since, when the orientation-determining film is exposed to an oxygen atmosphere in the chamber, an intricate step for removing the substrate from the vacuum chamber is not required, and the exposure step and the film formation step (including formation of the non-magnetic undercoat layer and the magnetic layer) can be successively performed in the chamber. In the case where the exposure step is performed in the chamber, when the chamber is evacuated to, for example, $10^{-6}$ Pa or less, preferably, the orientation-determining film is exposed to an atmosphere containing an oxygen gas of $5\times10^{-4}$ Pa or more. Although the orientation-determining film may be exposed to an oxygen gas at atmospheric pressure, the upper limit of the oxygen gas pressure is preferably $5\times10^{-2}$ Pa or less.

When the glass substrate is heated, the crystal orientation of the non-magnetic undercoat layer and the magnetic layer can be enhanced. The heating temperature of the glass substrate preferably falls within a range of 100° C. to 400° C. More preferably, the glass substrate is heated after formation of the orientation-determining film.

After formation of the non-magnetic undercoat layer, the magnetic layer (thickness: 15 nm to 40 nm) is formed through sputtering by use of a sputtering target containing a material of the magnetic layer. The sputtering target may contain, as a raw material, any one species selected from among a Co—Cr—Ta-based alloy, a Co—Cr—Pt-based alloy, a Co—Cr—Pt—Ta-based alloy, a Co—Cr—Pt—B-based alloy, a Co—Cr—Pt—B—Ta-based alloy, and a Co—Cr—Pt—B—Cu-based alloy. When a Co—Cr—Pt-based alloy is employed, preferably, the Cr content falls within a range of 10 at % to 25 at %, and the Pt content falls within a range of 8 at % to 16 at %. When a Co—Cr—Pt—B-based alloy is employed, preferably, the Cr content falls within a range of 10 at % to 25 at %, the Pt content falls with a range of 8 at % to 16 at %, and the B content falls within a range of 1 at % to 20 at %, from the viewpoint of improvement of SNR. When a Co—Cr—Pt—B—Ta-based alloy is employed, preferably, the Cr content falls within a range of 16 at % to 24 at %, the Pt content falls within a range of 8 at % to 16 at %, the B content falls within a range of 2 at % to 8 at %, and the Ta content falls within a range of 1 at % to 4 at %. When a Co—Cr—Pt—B—Cu-based alloy is employed, preferably, the Cr content falls within a range of 16 at % to 24 at %, the Pt content falls within a range of 8 at % to 16 at %, the B content falls within a range of 2 at % to 8 at %, and the Cu content falls within a range of 1 at % to 4 at %.

The non-magnetic undercoat layer is preferably formed such that crystals of Cr or a Cr alloy are predominantly oriented along a (100) plane.

When a non-magnetic intermediate layer is provided between the non-magnetic undercoat layer and the magnetic layer, preferably, the intermediate layer is formed by use of a sputtering target containing, as a raw material, a Co—Cr-based alloy (Cr content: 25 at % to 45 at %). When the magnetic layer contains B, preferably, the non-magnetic intermediate layer is formed under the sputtering conditions such that the Cr content of a region in the vicinity of the boundary between the non-magnetic undercoat layer and the magnetic layer, in which the B content is 1 at % or more, becomes 40 at % or less.

After formation of the magnetic layer, a protective film (e.g., a protective film predominantly containing carbon) is formed through a known technique, such as sputtering, plasma CVD, or a combination thereof.

If desired, a lubrication layer is formed on the protective film through application of a fluorine-based lubricant (e.g., perfluoropolyether) by means of, for example, dipping or spin coating.

EXAMPLES

Example 1

Amorphous Glass GD-7 (product of Nippon Sheet Glass Co., Ltd.), which is 65 mm in outer diameter, 20 mm in inner diameter, and 0.635 mm in thickness, was employed as a glass substrate.

The glass substrate was subjected to mechanical texturing. Mechanical texturing was performed under the following conditions. A polishing slurry containing diamond abrasive grains having a size of 0.15 µm at D90 was employed. The slurry was added dropwise to the substrate at a rate of 50 ml/minute for two seconds before initiation of mechanical texturing. A polishing tape formed of polyester woven fabric was employed. The polishing tape was moved at a rate of 75 mm/minute. The substrate (i.e., disk) was rotated at 600 rpm, and reciprocated at a rate of 120 times/minute. The tape was pressed onto the substrate at a force of 2.0 kgf (19.6 N). Mechanical texturing was performed for 10 seconds. The surface of the resultant substrate was subjected to measurement by use of AFM (product of Degital Instrument), and the substrate was found to have an average surface roughness (Ra) of 4 Å and to include texture grooves having a line density of 25,000 lines/mm.

After the substrate was thoroughly washed and dried, the substrate was placed in a DC magnetron sputtering apparatus (model: C3010, product of ANELVA (Japan)). Subsequently, the apparatus was evacuated to $2 \times 10^{-7}$ Torr ($2.7 \times 10^{-5}$ Pa), and then an orientation-determining film (thickness: 1 nm) was formed on the substrate at ambient temperature by use of a target containing a Co—W alloy (Co: 45 at %, W: 55 at %).

Thereafter, the substrate was heated to 250° C., and then exposed to oxygen at 0.05 Pa for five seconds. Subsequently, a non-magnetic undercoat layer (thickness: 8 nm) was formed by use of a target containing a Cr—Ti—B alloy (Cr: 83 at %, Ti: 15 at %, B: 2 at %). A non-magnetic intermediate layer (thickness: 2 nm) was formed by use of a target containing a Co—Cr alloy (Co: 65 at %, Cr: 35 at %). A CoCrPtB alloy layer (thickness: 20 nm) serving as a magnetic layer was formed by use of a target containing a Co—Cr—Pt—B alloy (Co: 60 at %, Cr: 22 at %, Pt: 12 at %, B: 6 at %), and a carbon protective film (thickness: 5 nm) was formed. During the course of formation of the layers and the film, the pressure of Ar was regulated to 3 mTorr (0.4 Pa). Through application of a lubricant containing perfluoropolyether by means of dipping, a lubrication layer (thickness: 20 nm) was formed.

Thereafter, the thus-produced magnetic recording media were subjected to a glide test at a glide height of 0.4 µinch by use of a glide tester, and recording and reproduction characteristics of the magnetic recording medium which had passed the glide test were evaluated by use of read/write analyzer RWA1632 (product of GUZIK (US)). In order to evaluate recording and reproduction characteristics, read-write conversion characteristics, including reproduction signal output (TAA), half power width of isolated read pulse (PW50), SNR, and overwrite (OW) were measured. Recording and reproduction characteristics were evaluated by use of a complex-type thin film magnetic recording head containing a giant magnetoresistive (GMR) element at the reproduction section. Recording of pattern signals was performed at 500 kFCI, and integration noise was measured at a frequency falling within a range of 1 MHz to a frequency corresponding to 375 kFCI. Reproduction output was measured at 250 kFCI, and SNR was calculated by use of the following equation: SNR=20×log(reproduction output/integration noise as measured at a frequency falling within a range of 1 MHz to a frequency corresponding to 375 kFCI). Coercive force (Hc) and squareness ratio (S*) were measured by use of a Kerr-effect-type magnetic characteristic measuring apparatus (model: RO1900, product of Hitachi Electronics Engineering Co., Ltd. (Japan)). Magnetic anisotropy index (OR) and magnetic anisotropy index of residual magnetization (MrtOR) were measured by use of a VSM (model: BHV-35, product of Riken Denshi Co., Ltd. (Japan)).

Examples 2 through 33

The procedure of Example 1 was repeated, except that the composition of an alloy for forming an orientation-determining film and the thickness of the film were changed as shown in Table 1.

Example 34

The procedure of Example 1 was repeated, except that an orientation-determining film (thickness: 5 nm) was formed at ambient temperature by use of a target containing a Co—W alloy (Co: 45 at %, W: 55 at %), an antiferromagnetic coupling layer was provided in place of the non-magnetic intermediate layer, a stabilization layer (thickness: 2 nm) was formed by use of a target containing a Co—Ru alloy (Co: 80 at %, Ru: 20 at %) was formed, and a non-magnetic coupling layer (thickness: 0.8 nm) was formed by use of a target containing Ru.

Comparative Examples 1 through 33

The procedure of Example 1 was repeated, except that the glass substrate was not subjected to mechanical texturing, and the composition of an alloy for forming an orientation-determining film and the thickness of the film were changed as shown in Table 2.

Comparative Examples 34 through 36

The procedure of Example 1 was repeated, except that the composition of an alloy for forming an orientation-determining film and the thickness of the film were changed as shown in Table 2.

Tables 1 and 2 show the results of evaluations of coercive force (Hc), squareness ratio, magnetic anisotropy index (OR), magnetic anisotropy index of residual magnetization (MrtOR), and read-write conversion characteristics of the magnetic recording media of Examples 1 through 34 and Comparative Examples 1 through 36. The results of Examples 1 through 7 show the effects of the thickness of the orientation-determining film formed of a Co—W-based alloy (Co: 45 at %, W: 55 at %). As shown in Table 1, the magnetic recording medium including the orientation-determining film having a thickness falling within a range of 25 to 300 Å exhibits excellent circumferential magnetic anisotropy and read-write conversion characteristics, and the magnetic recording medium including the orientation-determining film having a thickness falling within a range of 25 to 100 Å exhibits more excellent circumferential magnetic anisotropy and read-write conversion characteristics. In Examples 8 through 30, the composition of an alloy for forming the orientation-determining film was varied. The results show that the magnetic recording medium including the orientation-determining film formed of a Co—W-based alloy, a Co—Mo-based alloy, a Co—Ta-based alloy, a Co—Nb-based alloy, an Ni—Ta-based alloy, an Ni—Nb-based alloy, an Fe—W-based alloy, an Fe—Mo-based alloy, or an Fe—Nb-based alloy exhibits excellent circumferential magnetic anisotropy, as well as excellent recording and reproduction characteristics. In Examples 31 through 33, the orientation-determining film was formed of a ternary alloy. The results show that the magnetic recording medium including the orientation-determining film formed of a Co—W—Mo-based alloy, a Co—W—Ta-based alloy, or a Co—Ni—W-based alloy exhibits excellent circumferential magnetic anisotropy and read-write conversion characteristics.

In Comparative Examples 1 through 33, the glass substrates having no texture grooves on their surfaces were employed, and the orientation-determining films were formed of alloys employed for forming the orientation-determining films of the magnetic recording media of Examples 1 through 33. The results show that each of the magnetic recording media of the Comparative Examples, which includes the glass substrate having no texture grooves on its surface, exhibits no magnetic anisotropy, and exhibits read-write conversion characteristics inferior to those of the magnetic recording media of the Examples.

In Comparative Examples 34 through 36, the glass substrates having texture grooves on their surfaces were employed, and the orientation-determining films were formed of an Ni—P-based alloy (Ni: 80 at %, P: 20 at %). The results show that each of the magnetic recording media of Comparative Examples 34 through 36 exhibits circumferential magnetic anisotropy, but exhibits low coercive force and squareness ratio; i.e., poor read-write conversion-characteristics.

TABLE 1-1

| | Composition of alloy for orientation-determining film | Thickness of orientation-determining film Nm | Coercive force Oe | Squareness ratio |
|---|---|---|---|---|
| Example 1 | 45Co—55W | 1 | 4325 | 0.75 |
| Example 2 | 45Co—55W | 2.5 | 4461 | 0.77 |
| Example 3 | 45Co—55W | 5 | 4526 | 0.79 |
| Example 4 | 45Co—55W | 10 | 4521 | 0.79 |
| Example 5 | 45Co—55W | 20 | 4532 | 0.79 |
| Example 6 | 45Co—55W | 30 | 4561 | 0.79 |
| Example 7 | 45Co—55W | 50 | 4570 | 0.79 |
| Example 8 | 60Co—40W | 5 | 4411 | 0.78 |
| Example 9 | 25Co—75W | 5 | 4521 | 0.78 |
| Example 10 | 60Co—40Mo | 5 | 4458 | 0.76 |
| Example 11 | 45Co—55Mo | 5 | 4465 | 0.81 |
| Example 12 | 25Co—75Mo | 5 | 4468 | 0.77 |
| Example 13 | 55Co—45Ta | 5 | 4485 | 0.76 |
| Example 14 | 40Co—60Ta | 5 | 4492 | 0.80 |
| Example 15 | 55Co—45Nb | 5 | 4451 | 0.80 |
| Example 16 | 40Co—60Nb | 5 | 4496 | 0.77 |
| Example 17 | 25Co—75Nb | 5 | 4493 | 0.78 |
| Example 18 | 55Ni—45Ta | 5 | 4451 | 0.79 |
| Example 19 | 40Ni—60Ta | 5 | 4494 | 0.81 |
| Example 20 | 60Ni—40Nb | 5 | 4475 | 0.79 |
| Example 21 | 45Co—55Nb | 5 | 4456 | 0.76 |
| Example 22 | 25Co—75Nb | 5 | 4486 | 0.78 |
| Example 23 | 40Fe—60W | 5 | 4476 | 0.76 |
| Example 24 | 25Fe—75W | 5 | 4474 | 0.76 |
| Example 25 | 55Fe—45Mo | 5 | 4463 | 0.80 |
| Example 26 | 40Fe—60Mo | 5 | 4455 | 0.78 |
| Example 27 | 25Fe—75Mo | 5 | 4488 | 0.78 |
| Example 28 | 55Fe—45Nb | 5 | 4469 | 0.78 |
| Example 29 | 40Fe—60Nb | 5 | 4462 | 0.79 |
| Example 30 | 25Fe—7SNb | 5 | 4486 | 0.78 |
| Example 31 | 45Co—25W—20Mo | 5 | 4474 | 0.78 |
| Example 32 | 45Co—25W—20Ta | 5 | 4470 | 0.78 |
| Example 33 | 25Co—20Ni—55W | 5 | 4469 | 0.78 |
| Example 34 | 45Co—55W | 5 | 4525 | 0.80 |

TABLE 1-2

| | OR | MrtOR | TAA (μV) | OW (dB) | PW50 (ns) | SNR (dB) |
|---|---|---|---|---|---|---|
| Example 1 | 1.07 | 1.15 | 1360 | 41.5 | 9.11 | 19.5 |
| Example 2 | 1.19 | 1.32 | 1445 | 40.7 | 8.89 | 20.3 |
| Example 3 | 1.21 | 1.37 | 1497 | 39.8 | 8.95 | 20.6 |
| Example 4 | 1.22 | 1.36 | 1468 | 39.4 | 8.94 | 20.5 |
| Example 5 | 1.13 | 1.24 | 1422 | 38.9 | 9.05 | 19.8 |
| Example 6 | 1.10 | 1.16 | 1370 | 38.5 | 9.11 | 19.5 |
| Example 7 | 1.05 | 1.09 | 1317 | 38.7 | 9.15 | 19.1 |
| Example 8 | 1.14 | 1.24 | 1353 | 40.1 | 9.02 | 20.2 |
| Example 9 | 1.18 | 1.32 | 1411 | 39.5 | 8.99 | 20.4 |
| Example 10 | 1.13 | 1.26 | 1373 | 38.7 | 9.03 | 20.2 |
| Example 11 | 1.13 | 1.24 | 1331 | 38.8 | 9.06 | 20.1 |
| Example 12 | 1.13 | 1.27 | 1372 | 38.9 | 9.03 | 20.1 |
| Example 13 | 1.16 | 1.25 | 1320 | 38.8 | 9.07 | 20.0 |
| Example 14 | 1.14 | 1.27 | 1376 | 38.9 | 9.03 | 19.8 |
| Example 15 | 1.15 | 1.28 | 1358 | 38.9 | 9.04 | 20.0 |
| Example 16 | 1.14 | 1.21 | 1268 | 38.8 | 9.10 | 20.4 |
| Example 17 | 1.19 | 1.26 | 1416 | 38.9 | 9.00 | 19.6 |
| Example 18 | 1.15 | 1.26 | 1351 | 38.8 | 9.05 | 19.9 |
| Example 19 | 1.13 | 1.21 | 1279 | 38.6 | 9.10 | 20.3 |
| Example 20 | 1.14 | 1.23 | 1362 | 38.6 | 9.04 | 19.8 |
| Example 21 | 1.16 | 1.23 | 1359 | 38.7 | 9.04 | 20.2 |
| Example 22 | 1.12 | 1.22 | 1349 | 38.9 | 9.05 | 19.8 |
| Example 23 | 1.18 | 1.23 | 1351 | 38.8 | 9.05 | 19.9 |
| Example 24 | 1.15 | 1.24 | 1374 | 38.7 | 9.03 | 20.1 |
| Example 25 | 1.14 | 1.24 | 1348 | 38.6 | 9.05 | 19.6 |
| Example 26 | 1.13 | 1.28 | 1394 | 38.8 | 9.02 | 20.2 |
| Example 27 | 1.16 | 1.24 | 1302 | 38.6 | 9.08 | 20.0 |
| Example 28 | 1.12 | 1.24 | 1359 | 38.8 | 9.04 | 20.0 |
| Example 29 | 1.16 | 1.24 | 1358 | 38.8 | 9.04 | 20.1 |
| Example 30 | 1.18 | 1.23 | 1332 | 38.7 | 9.06 | 20.0 |
| Example 31 | 1.14 | 1.25 | 1374 | 38.8 | 9.03 | 19.9 |
| Example 32 | 1.19 | 1.24 | 1330 | 38.8 | 9.06 | 19.9 |
| Example 33 | 1.18 | 1.21 | 1319 | 38.8 | 9.07 | 20.3 |
| Example 34 | 1.23 | 1.37 | 1311 | 38.5 | 8.91 | 20.6 |

TABLE 2-1

| | Composition of alloy for orientation-determining film | Thickness of orientation-determining film Nm | Coercive force Oe | Squareness ratio |
|---|---|---|---|---|
| Comp. Ex. 1 | 45Co—55W | 1 | 1892 | 0.43 |
| Comp. Ex. 2 | 45Co—55W | 2.5 | 2578 | 0.56 |
| Comp. Ex. 3 | 45Co—55W | 5 | 3451 | 0.65 |
| Comp. Ex. 4 | 45Co—55W | 10 | 3895 | 0.69 |
| Comp. Ex. 5 | 45Co—55W | 20 | 4215 | 0.71 |
| Comp. Ex. 6 | 45Co—55W | 30 | 4200 | 0.71 |
| Comp. Ex. 7 | 45Co—55W | 50 | 4212 | 0.67 |
| Comp. Ex. 8 | 60Co—40W | 20 | 4233 | 0.67 |
| Comp. Ex. 9 | 25Co—75W | 20 | 4216 | 0.71 |
| Comp. Ex. 10 | 60Co—40Mo | 20 | 4204 | 0.68 |
| Comp. Ex. 11 | 45Co—55Mo | 20 | 4213 | 0.70 |
| Comp. Ex. 12 | 25Co—75Mo | 20 | 4233 | 0.67 |
| Comp. Ex. 13 | 55Co—45Ta | 20 | 4225 | 0.67 |
| Comp. Ex. 14 | 40Co—60Ta | 20 | 4238 | 0.71 |
| Comp. Ex. 15 | 55Co—45Nb | 20 | 4211 | 0.71 |

TABLE 2-1-continued

| | Composition of alloy for orientation-determining film | Thickness of orientation-determining film Nm | Coercive force Oe | Squareness ratio |
|---|---|---|---|---|
| Comp. Ex. 16 | 40Co—60Nb | 20 | 4248 | 0.68 |
| Comp. Ex. 17 | 25Co—75Nb | 20 | 4218 | 0.72 |
| Comp. Ex. 18 | 55Ni—45Ta | 20 | 4242 | 0.71 |
| Comp. Ex. 19 | 40Ni—60Ta | 20 | 4221 | 0.69 |
| Comp. Ex. 20 | 60Ni—40Nb | 20 | 4236 | 0.71 |
| Comp. Ex. 21 | 45Co—55Nb | 20 | 4239 | 0.70 |
| Comp. Ex. 22 | 55Fe—45W | 20 | 4239 | 0.69 |
| Comp. Ex. 23 | 40Fe—60W | 20 | 4245 | 0.67 |
| Comp. Ex. 24 | 25Fe—75W | 20 | 4201 | 0.70 |
| Comp. Ex. 25 | 55Fe—45Mo | 20 | 4208 | 0.71 |
| Comp. Ex. 26 | 40Fe—60Mo | 20 | 4231 | 0.71 |
| Comp. Ex. 27 | 25Fe—75Mo | 20 | 4248 | 0.70 |
| Comp. Ex. 28 | 55Fe—45Nb | 20 | 4470 | 0.71 |
| Comp. Ex. 29 | 40Fe—60Nb | 20 | 4469 | 0.69 |
| Comp. Ex. 30 | 25Fe—75Nb | 20 | 4460 | 0.68 |
| Comp. Ex. 31 | 45Co—25W—20Mo | 20 | 4455 | 0.69 |
| Comp. Ex. 32 | 45Co—25W—20Ta | 20 | 4487 | 0.67 |
| Comp. Ex. 33 | 25Co—20Ni—55W | 20 | 4461 | 0.69 |
| Comp. Ex. 34 | 80Ni—20P | 5 | 3316 | 0.64 |
| Comp. Ex. 35 | 80Ni—20P | 10 | 3561 | 0.67 |
| Comp. Ex. 36 | 80Ni—20P | 20 | 3811 | 0.68 |

TABLE 2-2

| | OR | MrtOR | TAA ($\mu$V) | OW (dB) | PW50 (ns) | SNR (dB) |
|---|---|---|---|---|---|---|
| Comp. Ex. 1 | 1.00 | 1.00 | 926 | 45.6 | 10.51 | 10.2 |
| Comp. Ex. 2 | 1.00 | 1.00 | 1021 | 44.2 | 10.11 | 12.5 |
| Comp. Ex. 3 | 1.00 | 1.00 | 1178 | 43.5 | 9.77 | 16.6 |
| Comp. Ex. 4 | 1.00 | 1.00 | 1267 | 42.5 | 9.45 | 18.1 |
| Comp. Ex. 5 | 1.00 | 1.00 | 1290 | 41.3 | 9.32 | 18.7 |
| Comp. Ex. 6 | 1.00 | 1.00 | 1300 | 41.5 | 9.35 | 18.6 |
| Comp. Ex. 7 | 1.00 | 1.00 | 1287 | 41.1 | 9.34 | 18.7 |
| Comp. Ex. 8 | 1.00 | 1.00 | 1282 | 41.1 | 9.25 | 18.7 |
| Comp. Ex. 9 | 1.00 | 1.00 | 1276 | 41.1 | 9.25 | 18.4 |
| Comp. Ex. 10 | 1.00 | 1.00 | 1275 | 41.2 | 9.23 | 18.4 |
| Comp. Ex. 11 | 1.00 | 1.00 | 1261 | 41.3 | 9.36 | 18.5 |
| Comp. Ex. 12 | 1.00 | 1.00 | 1241 | 41.1 | 9.26 | 18.4 |
| Comp. Ex. 13 | 1.00 | 1.00 | 1294 | 41.3 | 9.35 | 18.7 |
| Comp. Ex. 14 | 1.00 | 1.00 | 1292 | 41.0 | 9.31 | 18.6 |
| Comp. Ex. 15 | 1.00 | 1.00 | 1261 | 41.2 | 9.28 | 18.4 |
| Comp. Ex. 16 | 1.00 | 1.00 | 1246 | 41.5 | 9.35 | 18.5 |
| Comp. Ex. 17 | 1.00 | 1.00 | 1284 | 41.2 | 9.35 | 18.6 |
| Comp. Ex. 18 | 1.00 | 1.00 | 1266 | 41.2 | 9.30 | 18.3 |
| Comp. Ex. 19 | 1.00 | 1.00 | 1269 | 41.3 | 9.38 | 18.5 |
| Comp. Ex. 20 | 1.00 | 1.00 | 1285 | 41.5 | 9.28 | 18.4 |
| Comp. Ex. 21 | 1.00 | 1.00 | 1252 | 41.3 | 9.35 | 18.6 |
| Comp. Ex. 22 | 1.00 | 1.00 | 1252 | 41.2 | 9.41 | 18.6 |
| Comp. Ex. 23 | 1.00 | 1.00 | 1298 | 41.4 | 9.23 | 18.7 |
| Comp. Ex. 24 | 1.00 | 1.00 | 1288 | 41.1 | 9.25 | 18.4 |
| Comp. Ex. 25 | 1.00 | 1.00 | 1265 | 41.4 | 9.23 | 18.4 |
| Comp. Ex. 26 | 1.00 | 1.00 | 1262 | 41.3 | 9.35 | 18.6 |
| Comp. Ex. 27 | 1.00 | 1.00 | 1285 | 41.1 | 9.33 | 18.5 |
| Comp. Ex. 28 | 1.00 | 1.00 | 1256 | 41.4 | 9.40 | 18.6 |
| Comp. Ex. 29 | 1.00 | 1.00 | 1267 | 41.1 | 9.24 | 18.6 |
| Comp. Ex. 30 | 1.00 | 1.00 | 1263 | 41.4 | 9.40 | 18.5 |
| Comp. Ex. 31 | 1.00 | 1.00 | 1245 | 41.3 | 9.35 | 18.5 |
| Comp. Ex. 32 | 1.00 | 1.00 | 1242 | 41.3 | 9.31 | 18.7 |
| Comp. Ex. 33 | 1.00 | 1.00 | 1288 | 41.1 | 9.42 | 18.6 |
| Comp. Ex. 34 | 1.04 | 1.15 | 1311 | 44.5 | 9.56 | 15.7 |
| Comp. Ex. 35 | 1.06 | 1.18 | 1325 | 43.2 | 9.42 | 18.1 |
| Comp. Ex. 36 | 1.08 | 1.21 | 1332 | 42.6 | 9.25 | 19.2 |

The present invention is directed to a magnetic recording medium including at least a glass substrate on which grooves are formed in a circumferential direction, an orientation-determining layer, a non-magnetic undercoat layer, a magnetic layer, and a protective film, wherein the layers and film are successively formed on the substrate, wherein the orientation-determining layer is formed of an alloy layer containing at least one element selected from the group consisting of Co, Ni, and Fe and at least one element selected from the group consisting of W, Mo, Ta, and Nb. With this constitution, the magnetic recording medium exhibits circumferential magnetic anisotropy and enhanced read-write conversion characteristics. Thus, the magnetic recording medium is suitable for high-density recording.

While the invention has been described in detail and with reference to specific embodiments thereof, it will be apparent to one skilled in the art that various changes and modifications can be made therein without departing from the spirit and scope thereof.

This application is based on Japanese Patent Application No. P2002-242518 filed Aug. 22, 2002, incorporated herein by reference in its entirety.

What is claimed is:

1. A magnetic recording medium comprising a glass substrate having grooves on the surface thereof, an orientation-determining layer, a non-magnetic undercoat layer, a magnetic layer, and a protective film, the layers and film being successively formed on the substrate, wherein the orientation-determining layer contains at least one alloy selected from the group consisting of a Co—W-based alloy, a Co—Mo-based alloy, a Fe—W-based alloy and a Fe—Mo-based alloy.

2. A magnetic recording medium according to claim 1, wherein the orientation-determining layer has a thickness falling within a range of 10 Å to 300 Å.

3. A magnetic recording medium according to claim 1, wherein the glass substrate is formed of amorphous glass.

4. A magnetic recording medium according to claim 1, wherein the grooves have a line density of at least 7,500 (lines/mm).

5. A magnetic recording medium according to claim 1, wherein the magnetic anisotropy index of the magnetic layer (coercive force in a circumferential direction/coercive force in a radial direction) is at least 1.05.

6. A magnetic recording medium according to claim 1, wherein the magnetic anisotropy index of residual magnetization (residual magnetization in a circumferential direction/residual magnetization in a radial direction) is at least 1.05.

7. A magnetic recording medium according to claim 1, wherein the non-magnetic undercoat layer contains a Cr layer, or a Cr alloy layer containing at least one element selected from the group consisting of Ti, Mo, Al, Ta, W, Ni, B, Si, and V.

8. A magnetic recording medium according to claim 1, wherein the magnetic layer contains at least one alloy selected from the group consisting of a Co—Cr—Ta-based alloy, a Co—Cr—Pt-based alloy, a Co—Cr—Pt—Ta-based alloy, a Co—Cr—Pt—B-based alloy, and a Co—Cr—Pt—B—Y-based alloy, wherein Y represents Ta or Cu.

9. A magnetic recording and reproducing apparatus comprising a magnetic recording medium as recited in claim 1, and a magnetic head for recording of data onto the medium and for reproduction of the data therefrom.

* * * * *